US012761147B2

(12) United States Patent
Zuo et al.

(10) Patent No.: US 12,761,147 B2
(45) Date of Patent: Oct. 13, 2026

(54) WAVELENGTH-SCANNING-BASED LENSLESS FOURIER PTYCHOGRAPHIC DIFFRACTION TOMOGRAPHY MICROSCOPY METHOD

(71) Applicant: Nanjing University of Science and Technology, Nanjing (CN)

(72) Inventors: Chao Zuo, Nanjing (CN); Qian Chen, Nanjing (CN); Jiasong Sun, Nanjing (CN); Shijie Feng, Nanjing (CN); Xuejuan Wu, Nanjing (CN); Yao Fan, Nanjing (CN); Linpeng Lu, Nanjing (CN); Yuzhen Zhang, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 90 days.

(21) Appl. No.: 18/864,133

(22) PCT Filed: Apr. 27, 2023

(86) PCT No.: PCT/CN2023/091011
§ 371 (c)(1),
(2) Date: Nov. 8, 2024

(87) PCT Pub. No.: WO2024/016774
PCT Pub. Date: Jan. 25, 2024

(65) Prior Publication Data

US 2025/0305949 A1 Oct. 2, 2025

(30) Foreign Application Priority Data

Jul. 19, 2022 (CN) ........................ 202210847769.1

(51) Int. Cl.
*G06F 17/14* (2006.01)
*G01N 21/41* (2006.01)

(52) U.S. Cl.
CPC ............ *G01N 21/41* (2013.01); *G06F 17/14* (2013.01)

(58) Field of Classification Search
CPC ................................ G01N 21/41; G06F 17/14
(Continued)

(56) References Cited

U.S. PATENT DOCUMENTS 10,082,662 B2 * 9/2018 Park .................. G01N 21/6458
10,215,697 B2 * 2/2019 Park ...................... G01N 21/45
(Continued)

FOREIGN PATENT DOCUMENTS

CN 105158894 A 12/2015
CN 105182514 A * 12/2015 ............ G02B 21/06
(Continued)

OTHER PUBLICATIONS

The International Search Report (PCT/ISA/210) issued in PCT/CN2023/091011, mailed on Jul. 3, 2023.
(Continued)

*Primary Examiner* — Isiaka O Akanbi
(74) *Attorney, Agent, or Firm* — Birch, Stewart, Kolasch & Birch, LLP

(57) ABSTRACT

The invention presents a lensless Fourier ptychographic diffraction tomography microscopy imaging method based on wavelength scanning. The technique uses only a wavelength-tunable light source for illumination on a lensless microscope experimental system to collect a series of coaxial holograms. Then, the three-dimensional scattering potential spectrum is filled using an iterative Fourier ptychographic method to restore the three-dimensional refractive index distribution of the sample directly. The present invention does not require complex modifications to traditional lensless on-chip microscopes. It can endow lensless
(Continued)

on-chip microscopes with the ability of pixel super-resolution three-dimensional tomographic imaging.

5 Claims, 2 Drawing Sheets

(58) Field of Classification Search
USPC ................. 356/521, 337, 479, 497, 128–237
See application file for complete search history.

(56) References Cited

U.S. PATENT DOCUMENTS

| | | | | |
|---|---|---|---|---|
| 11,644,791 | B2 * | 5/2023 | Sato | G03H 1/0866 359/15 |
| 11,768,463 | B2 * | 9/2023 | Chae | G03H 1/2205 359/9 |
| 12,326,392 | B2 * | 6/2025 | Van Oostrum | G01N 15/0211 |
| 2008/0137933 | A1 | 6/2008 | Kim | |
| 2013/0100241 | A1 | 4/2013 | Sato | |
| 2016/0210763 | A1 | 7/2016 | Horstmeyer et al. | |
| 2018/0231761 | A1 * | 8/2018 | Dai | H04N 23/56 |
| 2021/0264628 | A1 * | 8/2021 | Yoon | G06N 3/0464 |
| 2021/0372916 | A1 * | 12/2021 | Zuo | G01N 15/1429 |
| 2022/0228979 | A1 * | 7/2022 | Ziemczonok | G01N 21/278 |

FOREIGN PATENT DOCUMENTS

| | | | | |
|---|---|---|---|---|
| CN | 106768280 A | | 5/2017 | |
| CN | 108169173 A | * | 6/2018 | G01N 21/41 |
| CN | 108189173 A | | 6/2018 | |
| CN | 108519728 A | | 9/2018 | |
| CN | 112327473 A | | 2/2021 | |
| CN | 113112405 A | | 7/2021 | |
| CN | 115144371 A | | 10/2022 | |

OTHER PUBLICATIONS

An et al., "Quantitative Phase Microscopy Imaging Based on Ptychography," Laser & Optoelectronics Progress, vol. 54, 2017, 27 pages total.
Berdeu et al., "Comparative study of fully three-dimensional reconstruction algorithms for lens-free microscopy," Applied Optics, vol. 56, No. 13, May 1, 2017, pp. 1-13.
Isikman et al., "Lens-free optical tomographic microscope with a large imaging volume on a chip," PNAS, vol. 108, No. 18, May 3, 2011, pp. 7296-7301.
Zuo et al., "Lensless phase microscopy and diffraction tomography with multi-angle and multi-wavelength illuminations using a LED matrix," Optics Express, vol. 23, No. 11, 2015, pp. 1-15.

* cited by examiner

WAVELENGTH-SCANNING-BASED LENSLESS FOURIER PTYCHOGRAPHIC DIFFRACTION TOMOGRAPHY MICROSCOPY METHOD

TECHNICAL FIELD

The present invention belongs to three-dimensional refractive index imaging technology, specifically a lensless Fourier ptychographic diffraction tomography microscopy imaging method based on wavelength scanning.

BACKGROUND

High-throughput microscopy imaging, i.e., the technique of capturing images over a large field of view without compromising spatial and temporal resolution, is critical to imaging science in applications such as neuroscience, stem cell biology, developmental biology, early cancer diagnosis, and drug screening. We need to perform high-content quantitative analysis of multiple events in large cell populations. However, the amount of information that traditional microscopy imaging systems can provide is always limited by the Space bandwidth product (SBP), typically in the tens of millions of pixels. More specifically, traditional microscopes face a trade-off between resolution and field of view size. At low magnification, the field of view is large but the resolution is low; although the resolution is improved by switching to a high magnification mirror, the field of view is correspondingly reduced by a higher proportion. Recently developed computational optical microscopy technologies include lensless on-chip holographic microscopy imaging, Fourier ptychographic microscopy imaging, and synthetic aperture holographic microscopy. Among these methods, lensless super-resolved microscopy is the most promising technology for development. It achieves a large effective numerical aperture (NA) close to one in the native field of view of the imaging sensor without the need for lenses or other intermediate optical components. This further simplifies the imaging setup while effectively avoiding the inherent optical aberrations and chromatic problems of traditional lens-based imaging systems. In addition, the entire system can be miniaturized and manufactured at low cost, providing a potential solution for point-of-care medical diagnosis in resource-limited environments to reduce medical costs.

Although the lensless on-chip holographic microscopy imaging technology seems to effectively solve the spatial bandwidth product limitation of traditional microscopy imaging systems, there are still many problems that limit its practical application. First, because the sample is placed close to the sensor surface, the imaging resolution is limited by the pixel size of the imaging device. Due to limitations in technology and manufacturing processes, the resolution of current sensors is still far below the optical diffraction limit. Therefore, a large amount of research in this field has focused on "pixel super-resolution", and many methods have been proposed, such as two-dimensional lateral sub-pixel scanning of sensors, sub-pixel scanning of light source micro-displacement, axial multi-defocus distance scanning of sensors, wavelength scanning of illumination light, etc., to achieve detection with super-pixel resolution of more than twice. Second, label-free microscopy is the most ideal detection method for studying the dynamic processes and physiological activities of living cells. Many quantitative phase imaging techniques based on lensless on-chip microscopy have been developed. For example, we have achieved long-term observation of living cells using active plate scanning and multi-wavelength scanning methods. Finally, the lensless microscopy methods for both intensity measurement and phase recovery are aimed at imaging two-dimensional thin samples and lack three-dimensional tomographic capabilities. To date, only a few studies have investigated lensless imaging of three-dimensional thick samples. Isikman et al. combined the basic concept of lensless holographic microscopy with multi-angle illumination (Isikman S O, Bishara W, Mavandadi S, et al. Lens-free optical tomographic microscope with a large imaging volume on a chip[J]. Proceedings of the National Academy of Sciences, 2011, 108(18): 7296-7301.). The volume image of the object was reconstructed using the filtered back projection (FBP) algorithm. FBP ignores the diffraction information of the object and is therefore unable to image phase objects. In addition, the use of robotic anns makes the experimental setup complex and expensive. Zuo et al. used LED array to contruct an experimental system without mechanical displacement (Zuo C, Sun J, Zhang J, et al. Lensless phase microscopy and diffraction tomography with multi-angle and multi-wavelength illuminations using a LED matrix[J]. Optics express, 2015, 23(11): 14314-14328.), solving this problem by using optical diffraction tomography instead of filtered back projection in the error reconstruction process, and implementing multi-wavelength light sources at each illumination angle to recover the phase of the hologram. Recovering the refractive index distribution of a three-dimensional object from a hologram sequence is essentially an inverse scattering problem. Berdeu et al. established a lensless on-chip diffraction tomography platform using a 360° axially rotating robotic arm equipped with a fixed 45° tilt angle light source (Berdeu A, Momey F, Laperrousaz B, et al. Comparative study of fully three-dimensional reconstruction algorithms for lens-free microscopy[J]. Applied optics, 2017, 56(13): 3939-3951.). They calculate the complex amplitude of each illumination angle using phase slope or two-dimensional phase retrieval methods, taking diffraction effects into account. A full three-dimensional reconstruction is then obtained based on the Fourier diffraction theorem. The above methods all use experimental platforms based on multi-angle illumination. However, in lensless imaging, the objects are all defocused. As the angle of illumination changes, the imaging position of the sample changes by tens or even hundreds of microns. This means that the effective field of view in multi-angle illumination methods is much smaller than the size of the sensor target area. In addition, the movement of objects can also cause difficulties in image registration. For these reasons, the results of lensless 3D imaging are not ideal, and the resolution is still limited by the discrete sampling of the sensor.

SUMMARY OF THE INVENTION

The purpose of the present invention is to provide a lensless Fourier ptychographic diffraction tomography microscopy imaging method based on wavelength scanning.

The technical solution for achieving the purpose of the present invention is a wavelength-scanning-based lensless Fourier ptychographic diffraction tomography microscopy method, with the following steps:

Step 1: Collect the original intensity images;

Step 2: Construct the three-dimensional refractive index space of the object;

Step 3: Determine the corresponding position of the hologram collected at the corresponding wavelength on the 3D spectrum, and obtain the new refractive index distribution of the sample;

Step 4: Based on the new refractive index distribution of the sample, repeat Step 3 to complete the 3D spectrum iteration at the next wavelength and obtain the final refractive index distribution of the sample.

The raw intensity images are collected using a lensless on-chip microscopy system, which includes a wavelength-scanning illumination source and a sensor. The wavelength-scanning illumination source is a combination of a supercontinuum laser and an acousto-optic tunable filter, or a wavelength-multiplexed source composed of multiple monochromatic laser sources or a wavelength-scanning laser. When the wavelength-scanning illumination source is a combination of a supercontinuum laser and an acousto-optic tunable filter, the broadband beam emitted by the supercontinuum laser is filtered by the acousto-optic tunable filter and irradiated on the sample on the sensor surface.

The effective pixelsize of the 3D refractive index space n(r) of the object meets the final imaging resolution, and the number of pixels $N_x$, $N_y$, $N_z$ in the 3D matrix satisfies the minimum sampling number in each direction.

The specific steps for determining the corresponding positions of holograms collected at different wavelengths on the three-dimensional spectrum are as follows:

Step 3.1, calculate the scattering potential of the sample at the corresponding wavelength, the formula is:

$$V(r,\omega)=k_0^2(\omega)\left[n^2(r)-n_m^2\right]$$

where V(r, ω) is the scattering potential, $r=(r_x, r_y, r_z)$ is the spatial coordinates, ω=2πc/λ is the angular frequency, c is the speed of light in vacuum, $$k_0(\omega)=\frac{2\pi}{\lambda}$$

represents the wave number in vacuum, n(r) is the refractive index distribution of the sample, and $n_m$ is the refractive index of the background medium:

Step 3.2, perform a three-dimensional Fourier transform on the scattering potential V(r,ω) of the sample to obtain a three-dimensional Fourier spectrum $\hat{V}(u, \omega)$, where $u=(u_x, u_y, u_z)$ is the spatial frequency coordinate;

Project the three-dimensional sub spectrum along the $u_z$ direction to obtain the two-dimensional sub spectrum $\hat{V}(u_T, \omega)$. The formula is as follows:

$$\hat{V}(u_T,\omega)=\frac{j}{4\pi u_z}\hat{V}[u-k_m(\omega),\omega]\delta\left(u_z-\sqrt{k_m^2(\omega)-|u_T|^2}\right)$$

where $u_T=(u_x,u_y)$ represents the two-dimensional spatial frequency coordinate; $k_m(\omega)$ is the wave vector in the surrounding medium, $k_m(\omega)=|k_m(\omega)|=k_0(\omega)n_m$ is the wave number in the surrounding medium, $k_0(\omega)n_m$ is the radius of the three-dimensional sub spectrum, and δ(·) is the Dirac function;

Step 3.3, perform inverse Fourier transform on the two-dimensional sub-spectrum to obtain the normalized first-order scattering field complex amplitude $U_{sin}(r_T, \omega)$ on the focal plane; Using Rytov approximation, the complex amplitude on the focus plane is obtained based on the normalized first-order scattering field complex amplitude on the focus plane;

Step 3.4, use the angular spectrum method to propagate the complex amplitude on the focus plane to the sensor plane, obtaining the complex amplitude $U(r_T, \omega)$ of the sensor plane, and update the amplitude using the square root of the intensity $I(r_T, \omega)$. Then propagate the updated complex amplitude to the focal plane to obtain the updated complex amplitude $\overline{U}_{s1}(r_T, \omega)$ of the scattering field on the focal plane;

Step 3.5, perform ln(·) operation on the complex amplitude $\overline{U}_{s1}(r_T, \omega)$ to obtain the updated normalized first-order scattering field $\overline{U}_{sin}(r_T,\omega)=\ln[\overline{U}_{s1}(r_T,\omega)]$. Perform Fourier transform on $\overline{U}_{sin}(r_T,\omega)$ to obtain the updated two-dimensional spectrum $\bar{\hat{V}}(u_T, \omega)$; Remap $\bar{\hat{V}}(u_T, \omega)$ into an Ewald shell and insert it into the corresponding position of the original three-dimensional spectrum $\hat{V}(u, \omega)$. After performing a three-dimensional inverse Fourier transform on the updated three-dimensional spectrum $\bar{\hat{V}}(u, \omega)$, the updated refractive index distribution $\bar{n}(r)$ of the sample is obtained. The specific formula for amplitude update using the square root of intensity $I(r_T, \omega)$ is:

$$\bar{U}(r_T,\omega)=\sqrt{I(r_T,\omega)}\cdot\exp\{j\cdot\arg[U(r_T,\omega)]\}$$

Where j is the imaginary unit, arg(·) is the function to obtain the argument.

Compared with the existing technology, the present invention has significant advantages: (1) the present invention can achieve uniform resolution pixel super-resolution three-dimensional imaging in the entire field of view of the sensor; (2) the present invention has only one light source in a fixed position, which can maintain relatively high coherence and does not introduce mechanical displacement, thereby improving stability.

The present invention will be further described in detail regarding the accompanying drawings.

ATTACHED IMAGE DESCRIPTION

SPECIFIC IMPLEMENTATION METHOD

Figure 1:
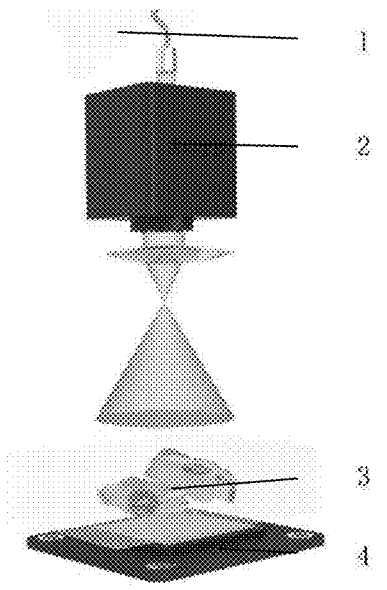
FIG. 1 is a schematic diagram of a wavelength-scanning-based tomography experimental setup based on lensless on-chip microscopy.
Figure 2:
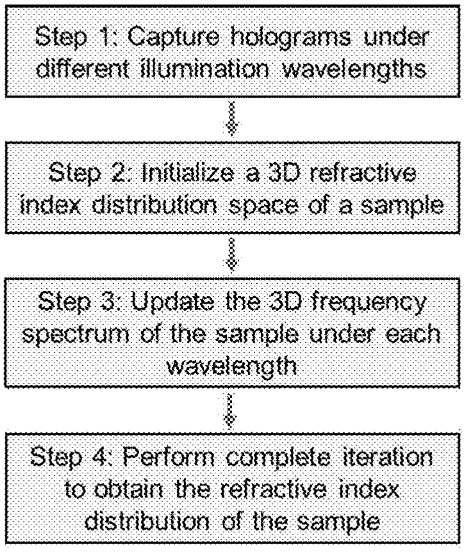
FIG. 2 is a flowchart of the large field pixel super-resolution lensless Fourier ptychographic diffraction tomography microscopy method based on wavelength scanning.
Figure 3:
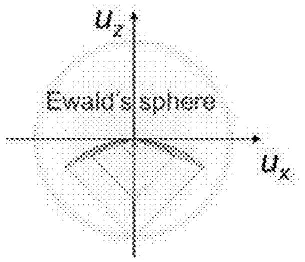
FIG. 3 shows the corresponding positions of holograms collected at different wavelengths on the three-dimensional spectrum.

In FIG. 2, a wavelength-scanning-based lensless Fourier ptychographic diffraction tomography method, including 4 steps:

Step 1: Collect the original intensity images;

In FIG. 1, the invention is based on a traditional lensless on-chip microscopy system, which includes a wavelength-scanning illumination source, a sample 3 and a sensor 4. The wavelength-scanning illumination source is a combination of a supercontinuum laser 1 (YSL SC-Pro7) and an acousto-optic tunable filter 2 (AOTF, YSL AOTF-Pro, bandwidth: 2-11 nm, RF1: 430-780 nm, RF2: 780-1450 nm). The wavelength-scanning range is 430-1450 nm with the interval of 1 nm. In addition, multiple monochromatic light sources (lasers, LEDs) can be coupled or wavelength scanning lasers can be used instead of the combination of supercontinuum lasers and acousto-optic filters to achieve wavelength scanning. The sample 3 is directly placed on the image sensor for imaging, and this system uses a board level monochrome CMOS sensor 4 (1.67 microns, 3872×2764, The Imaging Source DMX 24UJ003) for capture.

The specific implementation process is as follows: using a coherent light source with a wide range of tunable wavelengths, sequentially tuning the illumination wavelength {Δ', i=1, 2, . . . , N}, illuminating the sample, and synchronously triggering the camera to record holographic image sequences at different wavelengths, denoted $\{I_{exp}(r_T,\omega), \omega=\omega^1, \omega^2, \ldots, \omega^N\}$.

Step 2: Construct the three-dimensional refractive index space of the object;

The specific implementation process is as follows: assuming that the refractive index of the background medium is a constant, its refractive index is $n_m$. Construct a high-resolution three-dimensional refractive index space n(r) with a large field of view for the object. The pixel size of the three-dimensional refractive index space must meet the final imaging resolution, and the number of pixels $N_x$, $N_y$, $N_z$ in the three-dimensional matrix must meet the minimum sampling number in each direction.

Step 3: Determine the corresponding position of the hologram collected at the corresponding wavelength on the 3D spectrum, and obtain the new refractive index distribution of the sample; The specific implementation process is as follows:

Step 3.1, calculate the scattering potential of the sample at the corresponding wavelength, the formula is:

$$V(r,\omega)=k_0^2(\omega)\left[n^2(r)-n_m^2\right]$$

where V(r, ω) is the scattering potential, $r=(r_x, r_y, r_z)$ is the spatial coordinates, ω=2πc/λ is the angular frequency, c is the speed of light in vacuum, $$k_0(\omega)=\frac{2\pi}{\lambda}$$

represents the wave number in vacuum, n(r) is the refractive index distribution of the sample, and $n_m$ is the refractive index of the background medium;

Step 3.2, perform a three-dimensional Fourier transform on the scattering potential V(r,ω) of the sample to obtain a three-dimensional Fourier spectrum $\hat{V}(u, \omega)$, where $u=(u_x, u_y, u_z)$ is the spatial frequency coordinate;

Project the three-dimensional sub spectrum along the $u_z$ direction to obtain the two-dimensional sub spectrum $\hat{V}(u_T,\omega)$. The formula is as follows:

$$\hat{V}(u_T,\omega)=\frac{j}{4\pi u_z}\hat{V}[u-k_m(\omega),\omega]\delta\left(u_z-\sqrt{k_m^2(\omega)-|u_T|^2}\right)$$

where $u_T=(u_x,u_y)$ represents the two-dimensional spatial frequency coordinate; $k_m(\omega)$ is the wave vector in the surrounding medium, $k_m(\omega)=|k_m(\omega)|=k_0(\omega)n_m$ is the wave number in the surrounding medium, $k_0(\omega)n_m$ is the radius of the three-dimensional sub spectrum, and δ(·) is the Dirac function;

Step 3.3, perform inverse Fourier transform on the two-dimensional sub-spectrum to obtain the normalized first-order scattering field complex amplitude $U_{sin}(r_T, \omega)$ on the focal plane: Using Rytov approximation, the complex amplitude on the focus plane is obtained based on the normalized first-order scattering field complex amplitude on the focus plane;

Step 3.4, use the angular spectrum method to propagate the complex amplitude on the focus plane to the sensor plane, obtaining the complex amplitude $U(r_T, \omega)$ of the sensor plane, and update the amplitude using the square root of the intensity $I(r_T, \omega)$. Then propagate the updated complex amplitude to the focal plane to obtain the updated complex amplitude $\overline{U}_{s1}(r_T, \omega)$ of the scattering field on the focal plane;

Step 3.5, perform ln(·) operation on the complex amplitude $\overline{U}_{s1}(r_T,\omega)$ to obtain the updated normalized first-order scattering field $\overline{U}_{sin}(r_T,\omega)=\ln[\overline{U}_{s1}(r_T,\omega)]$. Perform Fourier transform on $\overline{U}_{sin}(r_T, \omega)$ to obtain the updated two-dimensional spectrum $\bar{\hat{V}}(u_T, \omega)$; Remap $\bar{\hat{V}}(u_T, \omega)$ into an Ewald shell and insert it into the corresponding position of the original three-dimensional spectrum $\hat{V}(u, \omega)$. After performing a three-dimensional inverse Fourier transform on the updated three-dimensional spectrum $\bar{\hat{V}}(u, \omega)$, the updated refractive index distribution $\overline{n}(r)$ of the sample is obtained. This completes a sub iteration of the lensless diffraction tomography algorithm based on wavelength scanning.

Step 4: Perform a complete iteration of the tested object to obtain the refractive index distribution n(r) of the sample.

Figure 4:
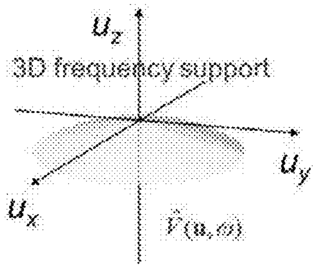
FIG. 4 is a schematic diagram of the spectral shape corresponding to the refractive index distribution of the final reconstructed sample.
Figure 5:
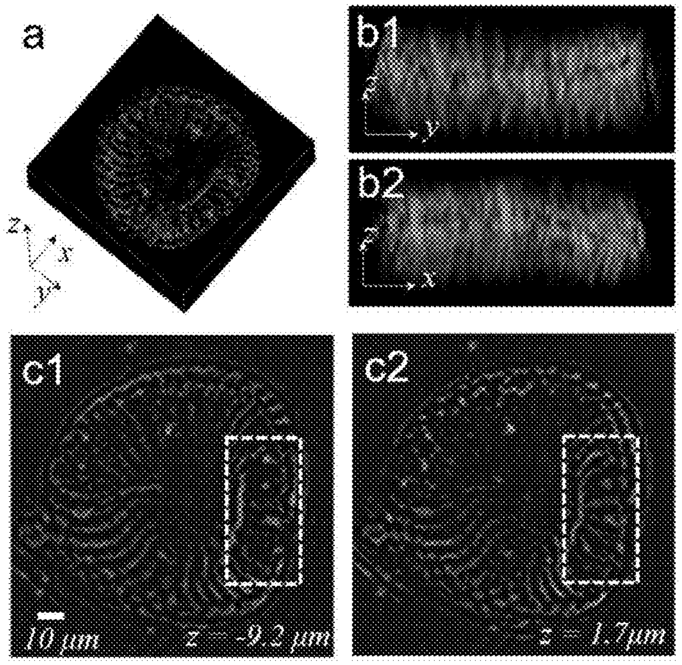
FIG. 5 shows the rendered three-dimensional refractive index distribution of a single diatom reconstructed using this method, as well as the two-dimensional refractive index distribution at different z-axis depths.

Update the new refractive index distribution $\overline{n}(r)$ obtained in steps 3.5 to 3.1, calculate the corresponding position of the hologram collected at another wavelength on the three-dimensional spectrum, and obtain the new refractive index distribution of the sample. Repeat step 3 multiple times to obtain the converged result. FIG. 4 shows the range covered by the Ewald sphere in three-dimensional frequency domain space under multi-wavelength illumination. FIG. 5 shows the rendered three-dimensional refractive index distribution of a single diatom reconstructed using this method, as well as the two-dimensional refractive index distribution at different z-axis depths.

The present invention only requires obtaining a series of holograms by tuning the illumination wavelength under vertical illumination of the light source, and then gradually combining these intensity images into the three-dimensional refractive index distribution of the sample using a multi-wavelength Fourier ptychographic diffraction tomography reconstruction algorithm combined with a propagation model. The present invention has only one light source in a fixed position, which can maintain relatively high coherence and does not introduce mechanical displacement, thereby improving the stability of the system.

The invention claimed is:

1. A wavelength-scanning-based lensless Fourier ptychographic diffraction tomography method, comprising:

step 1: sequentially illuminating a sample placed on a surface of a CMOS image sensor using a wavelength-scanning illumination source at a fixed position, and triggering the CMOS image sensor to collect a holographic intensity image sequence at a plurality of wavelengths to capture diffraction information of the sample, wherein the wavelength-scanning illumination source comprises a supercontinuum laser and an acousto-optic tunable filter (AOTF), the step 1 comprising emitting a broadband beam from the supercontinuum laser, filtering the broadband beam with the AOTF to provide a specific wavelength, and vertically irradiating the sample with the filtered beam;;

step 2: constructing, by a processor, a high-resolution three-dimensional (3D) refractive index space for the sample, wherein a pixel size of the 3D refractive index space is set to exceed a discrete sampling limit of the CMOS image sensor to achieve pixel super-resolution;

step 3: updating the 3D refractive index space at a corresponding wavelength by:

(a) calculating a scattering potential of the sample based on a refractive index distribution of the sample and a refractive index of a background medium;

(b) performing a 3D Fourier transform on the scattering potential to obtain a 3D Fourier spectrum, and projecting a 3D sub-spectrum along a direction to obtain a 2D sub-spectrum;

(c) performing an inverse Fourier transform on the 2D sub-spectrum to obtain a normalized first-order scattering field complex amplitude on a focal plane, and utilizing a Rytov approximation to obtain a complex amplitude on the focal plane;

(d) propagating the complex amplitude from the focal plane to a sensor plane using an angular spectrum method, updating an amplitude of the propagated complex amplitude using a square root of an intensity from the holographic intensity image sequence, and propagating the updated complex amplitude back to the focal plane;

(e) performing a logarithmic operation on the updated complex amplitude on the focal plane to obtain an updated normalized first-order scattering field, and performing a Fourier transform to obtain an updated 2D spectrum; and (f) filling the 3D Fourier spectrum by remapping the updated 2D spectrum into an Ewald shell and inserting it into a corresponding position of the 3D Fourier spectrum to obtain an updated refractive index distribution via 3D inverse Fourier transform; and step 4: repeating step 3 for each wavelength in the holographic intensity image sequence until the refractive index distribution converges, to produce a pixel super-resolved 3D tomographic image with uniform resolution across the entire field of view of the CMOS image sensor, wherein the 3D tomographic image comprises a rendered 3D refractive index distribution and a series of 2D refractive index distribution maps at different z-axis depths.

2. The wavelength-scanning-based lensless Fourier ptychographic diffraction tomography method according to claim 1, wherein in step 2, a number of pixels in a three-dimensional matrix of the high-resolution three-dimensional (3D) refractive index space satisfies a minimum sampling number in each direction.

3. The wavelength-scanning-based lensless Fourier ptychographic diffraction tomography method according to claim 1, wherein:

in step 3(a), the scattering potential is calculated by the formula:

$$V(r,\omega)=k_0^2(\omega)\left[n^2(r)-n_m^2\right]$$

where I (r, ω) is the scattering potential, $r=(r_x, r_y, r_z)$ is spatial coordinates, ω=2πc/λ is angular frequency, c is speed of light in vacuum, $$k_0(\omega)=\frac{2\pi}{\lambda}$$

represents the wave number in vacuum, n(r) is refractive index distribution of the sample, and $n_m$ is the refractive index of the background medium; and in step 3(b), the 2D sub-spectrum obtained by projecting the 3D sub-spectrum along a $u_2$ direction is calculated by the formula:

$$\hat{V}(u_T,\omega)=\frac{j}{4\pi u_z}\hat{V}[u-k_m(\omega),\omega]\delta\left(u_z-\sqrt{k_m^2(\omega)-|u_T|^2}\right)$$

where $u_T=(u_x, u_y)$ represents a two-dimensional spatial frequency coordinate; $k_m(\omega)$ is a wave vector in a surrounding medium, $k_m(\omega)=|k_m(\omega)|=k_0(\omega)n_m$ is a wave number in the surrounding medium, $k_0(\omega)n_m$ is a radius of the 3D sub-spectrum, and δ(·) is a Dirac function.

4. The wavelength-scanning-based lensless Fourier ptychographic diffraction tomography method according to claim 1, wherein in step 3(c), the complex amplitude on the focal plane obtained using the Rytov approximation is calculated by the formula:

$$U_{s1}(r_T,\omega)=U_{in}(r_T,\omega)\exp[U_{s1n}(r_T,\omega)]$$

where $U_{s1}(r_T, \omega)$ is the complex amplitude.

5. The wavelength-scanning-based lensless Fourier ptychographic diffraction tomography method according to claim 1, wherein in step 3(d), the amplitude update on the sensor plane using the square root of the intensity is performed according to the formula:

$$\bar{U}(r_T,\omega)=\sqrt{I(r_T,\omega)}\cdot\exp\{j\cdot\arg[U(r_T,\omega)]\}$$

where j is the imaginary unit, $I(r_T, \omega)$ is the square root of intensity, arg(·) is an argument function to obtain a phase angle.

* * * * *